Patented Apr. 19, 1932

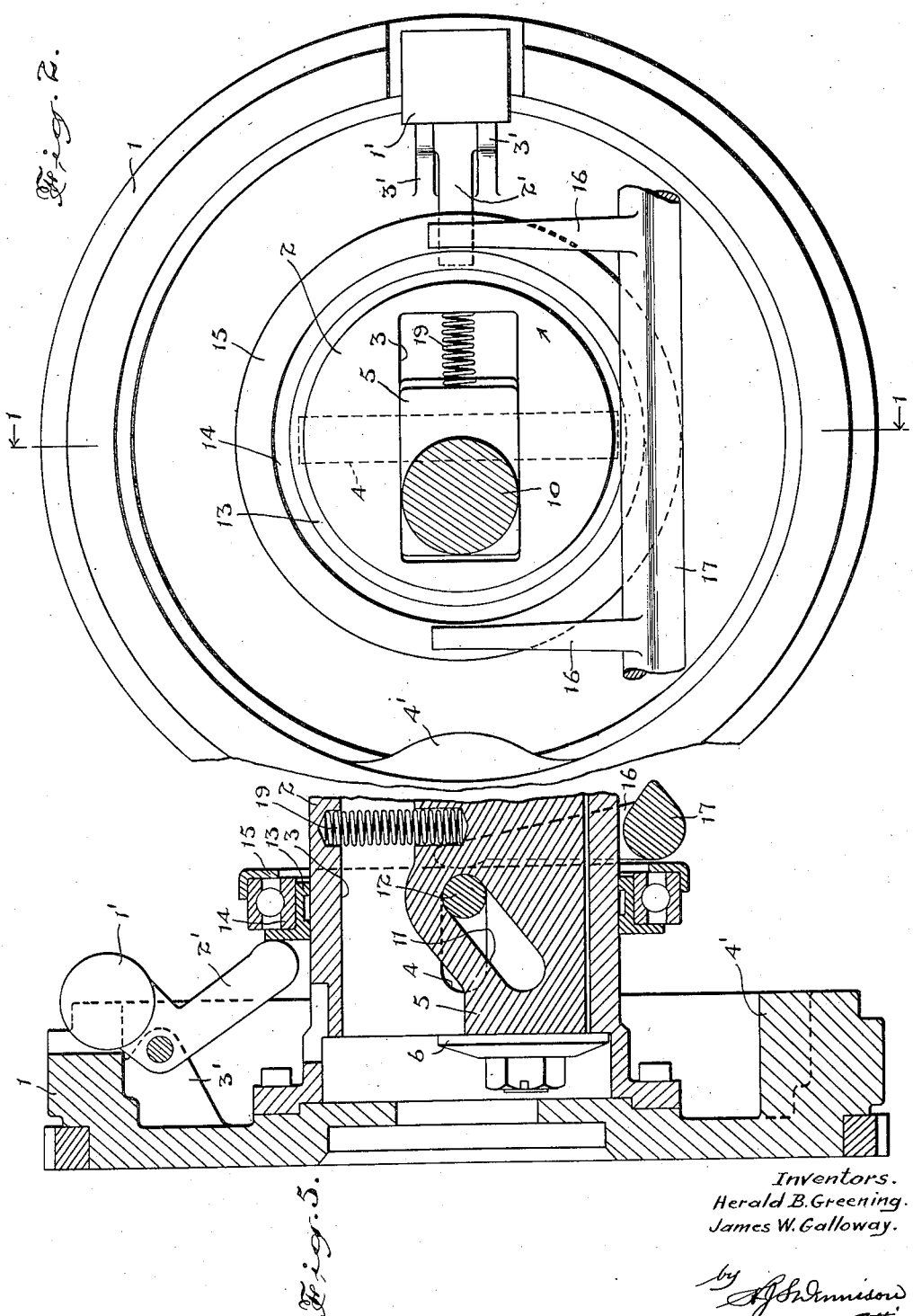

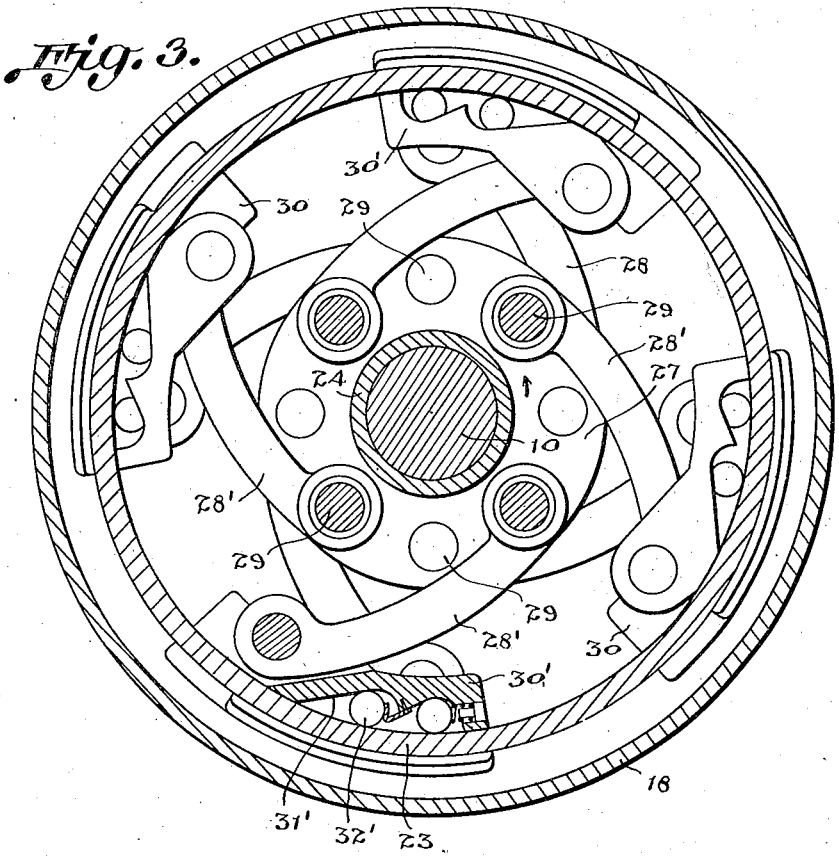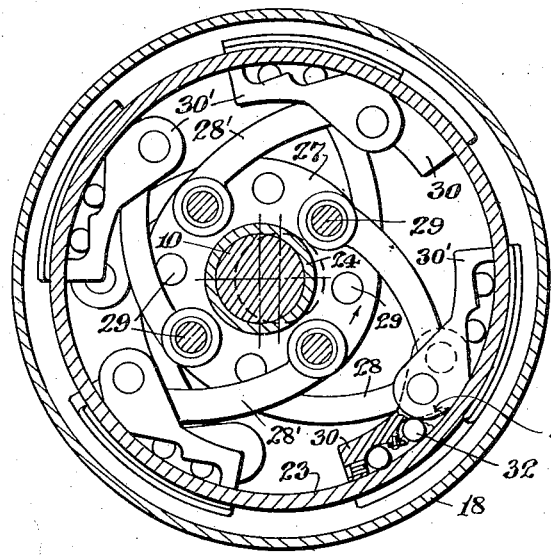

1,854,403

UNITED STATES PATENT OFFICE

HERALD B. GREENING, OF HAMILTON, ONTARIO, CANADA, AND JAMES W. GALLOWAY, OF DETROIT, MICHIGAN, ASSIGNORS TO GALLOWAY ENGINEERING COMPANY LIMITED, OF HAMILTON, ONTARIO, CANADA

VARIABLE SPEED TRANSMISSION

Application filed April 1, 1929. Serial No. 351,727.

The principal objects of the invention are to provide a mechanism which will operate to transmit power from a driving to a driven shaft at varying speeds while maintaining a constant operative connection therebetween and which will permit change of torque at either driving or driven end, thus providing a mechanism particularly adapted for use in motor vehicles where a wide range of variation in torque is desirable and essential.

The principal feature of the invention consists in the novel adaptation of a crank member adjustably mounted in the driving member and carrying a plurality of clutch mechanisms operatively engaging a fixed member and the driven member, whereby the relation of said crank member to the axis of the driving member may be varied independent of the driving member to vary the speed and torque of the driven member independent of the torque and speed of the driving member, and further in the novel means for controlling the relative position of said crank member.

In the accompanying drawings, Figure 1 is a longitudinal mid-sectional view taken through the line 1—1 of Figure 2.

Figure 2 is a transverse sectional view taken on the line 2—2 of Figure 1.

Figure 3 is a transverse sectional view taken on the line 3—3 of Figure 1.

Figure 4 is a view similar to Figure 3 showing the relative position of the parts with the crank pin arranged eccentric to the axis of the driving shaft.

Figure 5 is a horizontal section and elevation of the crank pin carrying member taken on the line 5—5 of Figure 1.

Figure 1:
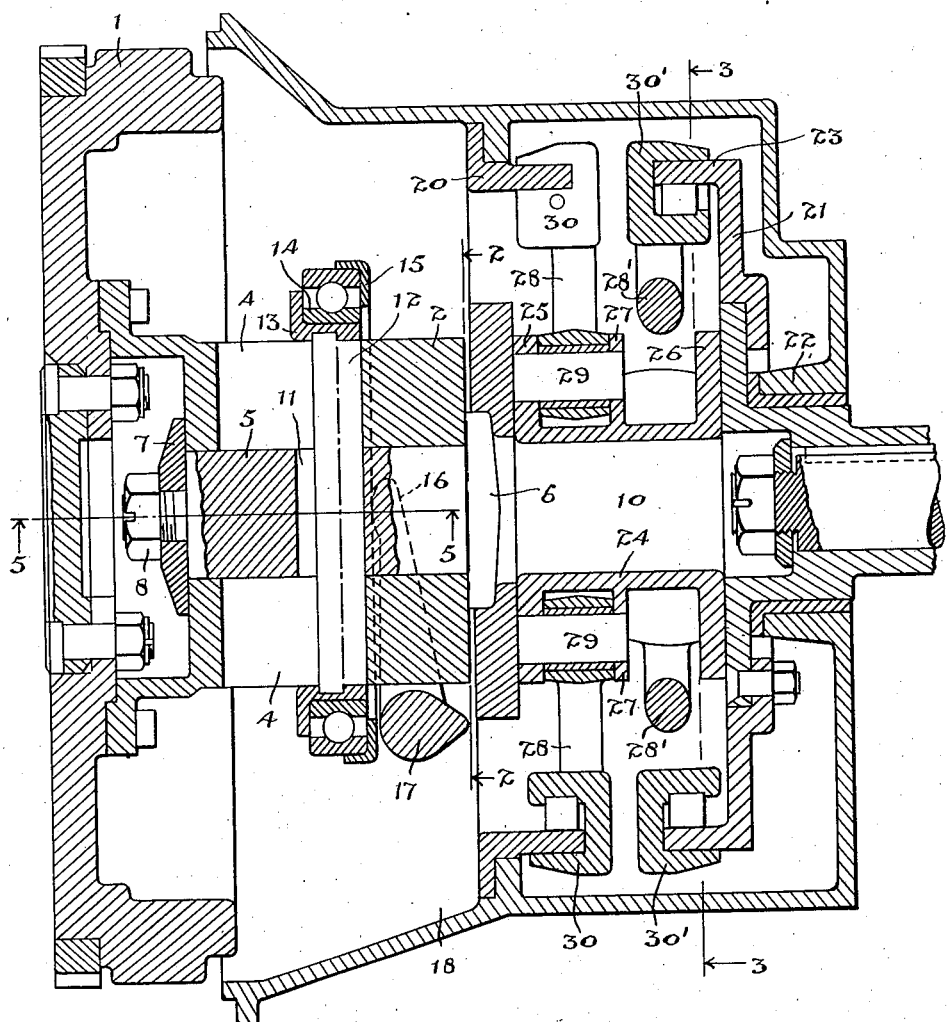

In the accompanying drawings the engine fly wheel 1 has centrally secured thereto a flanged cylindrical hub 2 which is formed with a transverse slot 3 extending from end to end thereof and a pair of longitudinally arranged slots 4 are disposed in right angular relation to the slot 3 and are arranged centrally of the width thereof.

A block 5 of substantially rectangular form in cross section is arranged in the slot 3 and is adapted to slide from side to side thereof, said block having a guiding shoulder or flange 6 slidably engaging the flat inner end of the hub 2 and a flange washer 7 is secured on the other end of the block to engage the opposite end face of the hub 2, it being secured in position by the nut 8 mounted on the reduced end 9 of the block.

A crank pin 10 forms an integral part of the block 5 and extends from the shoulder flange 6.

The block 5 is formed with a diagonally disposed slot 11 arranged in an acute angular relation to the slots 4 in the hub. This slot extends through the block 5 from the faces slidably engaging the flat faces of the slot 3 in the hub and it intersects the longitudinal slots 4.

A pin 12 extends through the slots 4 and 3 and its ends are secured in a ring 13 encircling the hub.

A ring bearing 14 is mounted on the ring 13 and a flanged face ring 15 carried by the outer bearing ring is engaged by the fork arm 16 secured to the rod 17 which extends transversely beneath the hub and is mounted in suitable bearings in the side walls of the casing 18 and is provided with a suitable lever connection for operating the same.

The block 5 is normally held in the position shown in Figure 5 at one side of the slot 3 by the compression spring 19. The crank pin 10 is thus held normally eccentric to the fly wheel or driving member.

The rotation of the rod 17 to press the fork arm 16 against the bearing ring which carries the pin 12, causes the pin to be moved longitudinally in the slots 4 and this longitudinal movement of the pin 12 engages the diagonal surface of the slot 11 in the block 5 and forces the block to move laterally in the slot 3 against the spring 19, thereby altering the relative eccentric position of the crank pin 10 to the driving member.

It will be noted that as the block 5 is normally held in the position shown in Figure 5, off centre to the fly wheel, the weight of the block will unbalance the rotating parts and to correct this condition a weight 1' forming part of an arm 2' is pivotally mounted between lugs 3' arranged on the fly wheel in such a position as to counter-balance the weight of the block 5. The inward end of the arm 2' engages the ring 13 and when the ring is moved toward the fly wheel to shift the position of the block 5 the position of the counter balance 1' is automatically changed in unison with the block to maintain the balance. When the block 5 is shifted to the position where the crank pin 10 is in line with the axis of the fly wheel the counter balance 1' will create an unbalanced condition and a fixed counter balance 4' is arranged on the rim of the fly wheel to offset the weight of the member 1' and its supports.

A flange ring 20 is rigidly mounted in the casing 18 and is concentric with the driving member 1.

A flanged driven member 21 is mounted in a bearing 22 in the casing 18 concentric with the driving member, the flange 23 thereof being of the same diameter as the flange of the ring 20.

A ring 24 rotatably mounted on the crank pin 10 is provided with end flanges 25, 26, and a central flange 27.

A plurality of arms 28 which are preferably curved in their length are journalled at their inner ends between the flanges 25 and 27 on pins 29 mounted in said flanges and upon the outer ends of the arms 28 are pivotally mounted the clutch shoes 30. These shoes are each formed with a bevelled recess 31 in which is arranged a spring held roller 32 which is adapted to grip the fixed flange ring 20.

A similar set of arms 28' are mounted on the pins 29 between the flanges 26 and 27 of the ring 24 and these are provided with friction shoes 30' which are provided with recesses 31' bevelled in the opposite direction to the recesses 31 in the shoes 30 and spring held rollers 32' are arranged in the latter recesses to grip the flange 23 of the driven member 21.

As the crank pin 10 rotates about the axis of the driven member, the clutch shoes 30 progressively grip the flange ring 20, thereby rotating the ring 24 on the crank pin and this rotation of the ring 24 is carried by the arms 28' to the shoes 30' which grip the flange 23 of the driven member and cause it to rotate.

The speed of rotation of the driven member through the mechanism described is directly in relation to the position of the crank pin in relation to the driving member, that is to say, when the crank pin is arranged in axial alignment with the driving member the arms 28 and 28' with their clutch shoes will have no relative movement and the device will be a free clutch but immediately upon the crank pin being shifted out of alignment with the axis of the driving member, a transmission of motion from the driving to the driven member takes place and the ratio may be varied at will by the manipulation of the control ring 13 carrying the pin 12 which shifts the position of the block 5 in the hub 2.

It will be understood from this description that as the speed of the driving member may be altered at will and also as the relative speed of the driven member may be altered at will, irrespective of the speed of the driving member, the torque may be varied at either driving or driven ends or both, thus providing a mechanism adaptable particularly for the operation of motor vehicles where an increase of torque with the reduction of speed at the driven end is desirable and a flexible variation of such without disconnection from the source of power can be obtained.

In the operation of the device according to the present invention, assuming the control parts to be in the position shown in Figures 2, 4 and 5 and the driving member rotating at a given speed, the driven member will then be driven at its maximum speed in relation to the speed at which the driving member is operating.

Now assuming it is desired to stop operation of the driven member without stopping operation of the driving member, the rod 17 is rotated (such as by pressure on a clutch pedal of a motor car) to press the fork arm against the ring carrying pin 12 so that the pin engages the diagonally disposed wall of the slot 11 in the block 5, thus forcing the block 5 radially inward against the spring pressure until the crank pin 10 is in axial alignment with the axis of the driving member. There will then be no rotation of the driven member.

If now it is desired to again impart rotation to the driven member, the rod 17 is permitted to rotate a desired amount in the reverse direction (as by relieving the pressure on the clutch pedal) so that the spring means will be free to urge the block 5 outwardly carrying the crank pin 10 out of its neutral position or radial relation with the driving member.

A clutching displacement of the respective sets of arms 28 and 28' thus takes place which action is more fully defined in our prior United States Patent 1,787,267, of December 30, 1930, and need not be further described here.

Thus it will be seen that a greater or less degree of reverse movement of the rod 17 and fork 16 will permit a correspondingly greater or less degree of eccentricity of the crank pin 10 and the ratio of speed between the driving and driven members will be determined accordingly.

It will of course be understood that the spring means 19 is merely illustrative to indicate in a simple manner the fact that the block 5 is urged outwardly by spring means and such spring means may be located to operate on any of the movable control members so long as its action creates the desired outward movement of the block to urge the crank pin out of alignment with the axis of the driving member while the manual control means limits the amount of movement of the said block off centre.

A very flexible transmission unit is thereby obtained which is particularly applicable to motor car control and which differs from the said former patent in the control features above set forth, such patent embracing a control means wherein a crank is urged toward a concentric position by spring means and a manually controlled member moves the crank to eccentric positions so that release of the manual means causes the control parts to automatically assume a neutral position.

What we claim as our invention is:

1. In a variable speed transmission, the combination with the driving and driven members, a stationary clutch ring, a clutch ring carried by the driven member, and a plurality of clutch elements engaging each of said rings, of means carried by the driving member manually controllable during the operation of the device to alter the relative position of said clutch elements, spring means constantly urging said altering means toward the maximum speed transmission position, and means controlling said altering means and manually operable to alter the position of the latter in opposition to said spring means whereby a positive control of said transmission is provided for.

2. In a variable speed transmission, a driven member a driving member having a slot extending transversely thereof across its axis and being longitudinally slotted, a block slidably mounted in the transverse slot and having a diagonal slot intersecting the longitudinally slotted portion, a pin extending transversely through the slotted block into the longitudinally slotted portion, means for operating said pin to regulate the position of the block, a crank pin carried by said block, a fixed member and a plurality of clutch members carried by said crank pin and co-operating with the fixed and driven members.

3. A variable speed transmission, comprising a driven member, a driving member having a transverse slot extending across its axis, a block slidable in said slot and having a crank extension, said block having a diagonal slot therein, means movable longitudinally of the driving member engaging the diagonal slot in said block to move it transversely of the driving member, a spring engaging one side of said block to force it toward the opposite side, and hold said crank extension in eccentric relation to the axis of the driving member, a plurality of clutch arms mounted on said crank extension, and a fixed member non-rotatively engaged by certain of said clutch arms said driven member being engaged by others of said clutch arms.

4. In a variable speed transmission, the combination with the driving and driven members, of a crank pin carried by the driving member normally off centre, means operatively connecting said crank pin with the driven member, means controlled at will for varying the amount off centre of said crank pin in relation to the driving member to govern the operation of the driven member in accordance with the torque requirements, and a counter balance weight pivotally mounted on the driving member and having an arm engaging the means for shifting the position of the crank pin to swing the weight inwardly as the crank pin is moved toward the centre.

5. In a variable speed transmission, the combination with the driving and driven members, of a crank pin carried by the driving member normally off centre, means operatively connecting said crank pin with the driven member, means controlled at will for varying the amount off centre of said crank pin in relation to the driving member to govern the operation of the driven member in accordance with the torque requirements, a fly wheel on said driving member, a counter balance weight pivotally mounted on the fly wheel and having an arm engaging the means for shifting the position of the crank pin to swing the weight inwardly as the crank pin is moved toward the centre, and a fixed counter balance arranged on the fly wheel diametrically opposite to the pivotal counter balance.

HERALD B. GREENING.
JAMES W. GALLOWAY.